| United States Patent Office | 3,499,794
|---|---|
| | Patented Mar. 10, 1970 |

3,499,794
AVOIDING ENCRUSTATION IN A DROP SEPARATOR
Hermann Dieter Fromm, Gruenstadt, Matthias Schwarzmann, Limburgerhof, Pfalz, Ludwig Vogel, Frankenthal, Pfalz, and Alfred Widmann, Ludwigshafen (Rhine), Germany, assignors to Badische Anilin- & Soda-Fabrik, Aktiengesellschaft, Ludwigshafen (Rhine), Rhineland-Palatinate, Germany
No Drawing. Filed Apr. 23, 1968, Ser. No. 723,557
Claims priority, application Germany, Apr. 26, 1967,
1,670,216
Int. Cl. C23g 1/28; B08b 3/08
U.S. Cl. 134—5                7 Claims

ABSTRACT OF THE DISCLOSURE

Urea-containing reaction gas is washed with liquid urea to remove urea contained therein. Any drops of urea entrained with the gas are separated in a drop separator located downstream of the washing zone. To avoid encrustation in the separator, this is periodically flushed with molten urea which may contain melting point depressant substances.

---

It is known that melamine can be prepared by heating urea and/or its thermal decomposition products at temperatures of from 350° to 450° C. at atmospheric or superatmospheric pressure in the presence of catalysts and ammonia or gas mixtures containing ammonia.

The gaseous melamine is separated from the offgas by fractional condensation at temperatures of 150° to 250° C. The gas freed from melamine still contains unreacted urea which can be washed out by direct contact of the gas with molten urea or a mixture of liquid urea with substances which depress its melting point, all in known manner. The gas undergoes further cooling in the process. The cooled gas, which contains ammonia and carbon dioxide, may be returned to the synthesis zone or it may serve for cooling the hot reaction gas for the purpose of depositing the melamine contained therein. Obviously it is also possible to put the gas to other uses, for example to use it in the synthesis of urea or to utilise the ammonia content for the production of ammonium salts, for example ammonium nitrate or ammonium sulfate, by passing the gas into the appropriate acid.

It is also known that cyanuric acid can be prepared by heating urea and/or biuret at temperatures above 250° C. and preferably not higher than 400° C. This heating takes place on the surface of a molten metal as described in U.S. patent specification No. 3,275,631. In this process, too, unreacted urea sublimes off with the ammonia developed in the reaction and it is known that the offgas may be treated with molten urea in order to recover the urea.

To achieve efficient cooling in the treatment of this offgas containing urea it is advantageous to bring the urea into contact with the gas in the finest possible state of subdivision. This method of separating urea from offgas containing the same has the advantage over the use of condensers having large heat exchange surfaces (which have also been used for cooling such gas) that only a relatively small cooler is required for cooling the melt. In washing with liquid urea however it is inevitable that small droplets of urea become entrained by the cooling gas and are gradually deposited in subsequent pipelines and apparatus leading to encrustation which is very difficult to remove because urea, at the temperatures involved, namely about 120° to 150° C., slowly decomposes to cyanuric acid and other compounds having high melting points. This encrustation finally results in stoppages thus causing frequent trouble in operation. To avoid them, the urea droplets have to be separated. Conventional drop separators such as packed columns and the like may be used for the purpose but it is found that this does not solve the problem but merely transfers it to another place. As pipelines become encrusted when no drop separator is used, so when a drop separator is used it becomes encrusted within a short time and has to be dismantled for cleaning.

We have found that encrustation of the said type in a drop separator arranged on the gas side of a liquid urea washing can be avoided by flushing the drop separator periodically with molten urea or with a melt containing urea.

This result of the measure according to this invention is surprising because molten urea has practically no solvent power for the decomposition products (such as cyanuric acid, melamine cyanurate, and the like) which form in the drop separator.

The time interval between successive flushings of the drop separator depends on the size of the plant and of the drop separator itself. The amount of gas passed through the drop separator also plays an important part. In general it is sufficient to flush the drop separator at intervals of from two to six hours. By flushing we understand that the drop separator is filled with molten urea quite apart from whether it is introduced into the drop separator from the bottom or from the top. In general it is sufficient to leave the molten urea in the drop separator for from about five to ten minutes and then to withdraw it again, in order to keep the drop separator permanently free from encrustation.

The urea for flushing the drop separator may be used in the urea washing or it may be passed into the actual synthesis reactor and there reacted into melamine or cyanuric acid. The temperature of the molten urea is not of critical importance. It is however important that the temperature should be high enough to prevent any urea from crystallizing out in the drop separator. Obviously it is not necessary to use pure molten urea for flushing the drop separator, but substances may be added to the urea which will depress its melting point. An example of such a substance is biuret which may be present in the urea in an amount of up to 40% by weight, preferably up to 20% by weight. A urea melt containing 20% by weight of biuret is still mobile at 120° C. If the melt which has been used for flushing out the drop separator is then to be used for cooling the offgas, the melt may contain, besides urea, ammonium or guanidinium salts which are soluble therein by which the melting point of urea is markedly depressed. Thiocyanates and nitrates are preferred salts. These salts form eutectics which have very low melting points. For example the hitherto unknown eutectic of 55% by weight or urea and 45% by weight of ammonium thiocyanate melts at 29° C. and the hitherto unknown mixture of 25% by weight of ammonium nitrate, 30% by weight of ammonium thiocyanate and 45% by weight of urea melts at only 11° C. and is therefore liquid at room temperature in a wide range of concentrations. A melting point of 60° C. has been measured for a mixture of 55% by weight of ammonium acetate and 45% by weight of urea. The eutectic mixture of 55% by weight of guanidine thiocyanate and 45% by weight of urea has a melting point of 47° C. Small amounts of biuret, cyanuric acid, or thiourea, i.e. substances which are either contained in the offgas or are formed therefrom with the melts according to the invention, do not cause any trouble. The composition of the melt used is advantageously chosen so that its urea content lies between the urea content of the eutectic mixture and a urea content of 90% by weight.

Independently of the composition of the melt—whether it consists of pure urea or contains the above mentioned additives by which its melting point is depressed—it may be said as regards the temperature used for the process according to this invention that this should be at least high enough to prevent any solid from crystallizing out in the drop separator. As a rule a temperature is therefore chosen so that the melt in the drop separator has a temperature which is at least from about 2° to 10° C. above the temperature at which a solid phase separates depending on the composition of the melt chosen.

The invention is illustrated by the following example.

EXAMPLE

A: 6,000 m.$^3$ per hour of synthesis gas substantially freed from melamine is introduced at a temperature of 210° C. centrally into the top of a vertical injection cooler. 30 m.$^3$ per hour of a melt of urea and biuret is sprayed in at a temperature of 125° C. from jets surrounding the gas inlet, so that the gas is cooled to a temperature of from 132° to 135° C. The gas escaping from the cooler is then supplied to four separators arranged in parallel each of which consists of a column having a diameter of 600 mm. and a height of 1,000 mm. and being packed with Raschig rings. The drop separators are blocked by encrustation after an operating period of only two weeks. The cooling system has to be shut down and opened for cleaning; it is found that the Raschig rings in the drop separators are so seriously encrusted that the coating has to be removed with hammer and chisel.

B: The drop separators are supplied with gas as described under A but with the difference that each of them in turn is periodically flushed ever four hours for ten minutes with the liquid urea at a temperature of 125° C. which has been used for cooling. It is found that the drop separators, even after an operating period of four weeks, exhibit practically no encrustation and show the same pressure loss as at the time they were put into operation.

We claim:
1. A process for preventing encrustation in a drop separator located downstream of a liquid urea washing zone in which reaction gas containing urea is freed from its urea content, which comprises periodically flushing the drop separator with a melt containing urea.

2. A process as claimed in claim 1 wherein the periodic flushing is carried out every two to six hours.

3. A process as claimed in claim 2 wherein the melt remains in the drop separator for from five to ten minutes during each flushing operation.

4. A process as claimed in claim 1 wherein the melt contains biuret.

5. A process as claimed in claim 1 wherein the melt contains a salt selected from the group consisting of ammonium and guanidinium salts.

6. A process as claimed in claim 1 wherein the melt contains a salt selected from the group consisting of ammonium and guanidinium thiocyanates.

7. A process as claimed in claim 1 wherein the melt contains 25% by weight of ammonium nitrate, 30% by weight of ammonium thiocyanate and 45% by weight of urea.

References Cited

UNITED STATES PATENTS

| | | | |
|---|---|---|---|
| 2,716,629 | 8/1955 | Kodama et al. | 134—22 XR |
| 3,024,251 | 3/1962 | Feder et al. | 134—22 XR |

JOSEPH SCOVRONEK, Primary Examiner

JOSEPH T. ZATARGA, Assistant Examiner

U.S. Cl. X.R.

134—22, 42